Figure 1:
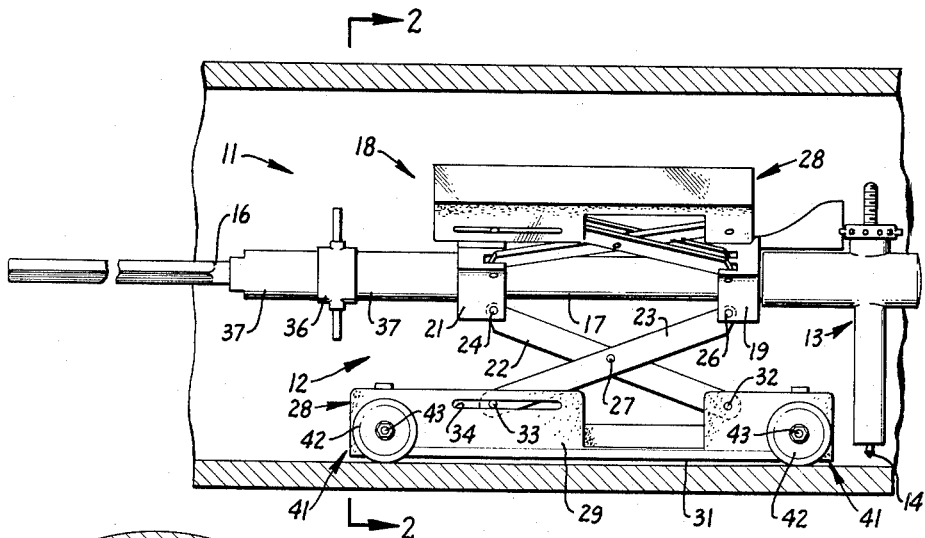

Feb. 15, 1966  J. B. GILL  3,234,826
ARBOR CONSTRUCTION FOR MOUNTING PIPE TOOLS
Filed Nov. 19, 1963  2 Sheets-Sheet 1

INVENTOR.
JOHN B. GILL
BY Schapp & Hatch
ATTORNEYS

Feb. 15, 1966    J. B. GILL    3,234,826
ARBOR CONSTRUCTION FOR MOUNTING PIPE TOOLS
Filed Nov. 19, 1963    2 Sheets-Sheet 2

INVENTOR.
JOHN B. GILL
BY
Schapp & Hatch
ATTORNEYS

United States Patent Office 3,234,826
Patented Feb. 15, 1966

3,234,826
ARBOR CONSTRUCTION FOR MOUNTING PIPE TOOLS
John B. Gill, Box 2127, Torrance, Calif.
Filed Nov. 19, 1963, Ser. No. 324,766
12 Claims. (Cl. 82—4)

The present invention relates to improvements in an arbor construction for mounting pipe tools and particularly to such a construction capable of holding power tools such as pipe cutters and pipe machining tools for rotation around the central axis of the pipe.

When it is necessary to cut or machine pipe in the field, it is desirable to utilize means for holding the tool which uses the pipe itself as the anchor for the tool so as to retain the tool in proper operating position and resist the machining or cutting forces. Conventionally, pipe tools are mounted on the exterior surface of the pipe and the pipe thereby serves to support the tool. However, certain arbors or pipe tool holding mechanisms have been developed in which an arbor shaft is mounted on the inside of the pipe and this shaft then serves to provide a support along the axis of the pipe so that tools may be rotated therearound in the proper aligned position to machine or cut the pipe.

A typical type of arbor construction which grips the pipe surface from the inside thereof and supports an arbor shaft in central alignment has been developed by John T. Montgomery and this construction is described in detail in his United States Patent 2,607,376. Typically, these arbors are used to support tools for cutting or machining pipes at or near the ends thereof as illustrated in the cited patent and in the co-pending application of John B. Gill, the inventor in the present application, entitled Adjustable Pipe Machining Tool, filed July 14, 1959 under Serial No. 827,043.

These tool holding mechanisms have been eminently successful and various designs have been made to improve their performance for various types of operations. However, one of the major advantages of these tools is their use on larger diameter pipes where externally supported tools become impractical. The structure shown in the Montgomery patent is designed for pipe sizes of about 3 to 8 inches, and although suitable for larger sizes than 8 inches, as the pipe size becomes larger, certain problems are encountered. In addition, it has been found desirable to utilize holding mechanisms of the character described to cut pipes from the interior thereof and these internal cutting machines are also especially suitable for larger pipe diameters.

In this connection, the inventor of the present invention has provided an improvement over the Montgomery type holding mechanism which is suitable for use with larger pipes by solving certain of the problems, and these problems and the solutions thereto are discussed in length in the inventors co-pending United States patent application entitled Arbor Construction for Pipe Tools filed November 19, 1963 under Serial No. 324,765. In addition, the present inventor has also developed an improved internal pipe cutter utilizing said improved holding means and this improved internal pipe cutter is the subject matter of United States application Serial No. 300,029 filed August 5, 1963 and entitled Internal Pipe Cutter. While the internal centering devices embodying this improved form are capable of use with larger pipes, it is found that when they are used with pipes of 20 inches and larger, they become extremely heavy. Accordingly, it is desirable to provide further improvements so that pipe sizes of say 42 inch diameter or even larger may be handled in the field at the job site. The present invention is directed to such an improvement and provides means for handling tools for such pipe sizes and yet retains all of the advantageous features of the prior centering devices.

When machining large pipes, it is also necessary to use powered units in order to provide sufficient forces for the machining or cutting operations to be accomplished in an efficient manner. The use of this powered equipment supplies large forces and a strong tendency for the support to rotate within the pipe along with the cutting tool or machining tool. The present invention also provides means for solving this problem.

Accordingly, it is a primary object of the present invention to provide an arbor construction of the character described which is capable of handling heavy tools for use with extra large pipes.

Another object of the invention is to provide an arbor construction of the character described which is especially suitable for use with pipes containing fragile linings such as epoxy lined asbestos-cement pipes.

A further object of the invention is to provide an arbor construction of the character described which is especially suitable for providing internal cutting or machining operation on large pipes.

A still further object of the invention is to provide an arbor of the character described having means thereon which assists handling and aids balance, yet which is simple in construction and absolutely reliable in operation.

Still another object of the invention is to provide an arbor construction suitable for machining and cutting operations on large pipes in which an especially strong grip is obtained by the mechanism on the internal surface of the pipe.

Further objects and advantages of my invention will be apparent as the specification progresses, and the new and useful features of my arbor construction for mounting pipe tools will be fully defined in the claims attached hereto.

It has now been found that the above objects and advantages may be achieved by mounting the arbor construction on a wheeled supporting structure through a design which enables the wheeled support to move the arbor construction easily for axial positioning within the pipe yet which is constructed to retract the supporting surface of the periphery of the wheels out of its supporting position so as to enable the arbor construction to function in its intended manner in centering and holding the arbor shaft.

It is particularly important to provide means for displacing the periphery of the wheeled supporting structure toward the central axis of the arbor with respect to the gripping surface of the expandable member, because the arbor construction contains automatic centering means that function best when the extremities of the expandable fingers contained in arbor constructions of this nature are expanded against the internal pipe surface at three positions preferably 120° apart. As explained above, in the preferred form of the invention, the arbor fingers carry elongated pipe engaging members which actually engage the internal surface of the pipe; however, it is still important that these pipe engaging members be clamped in the position indicated so as to absolutely center the arbor shaft and align it without any cant or offset with respect to the pipe axis.

Figure 2:
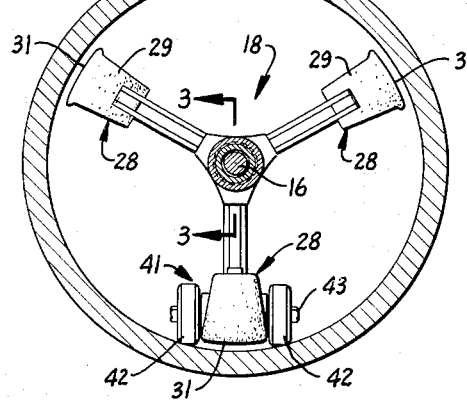
Figure 3:
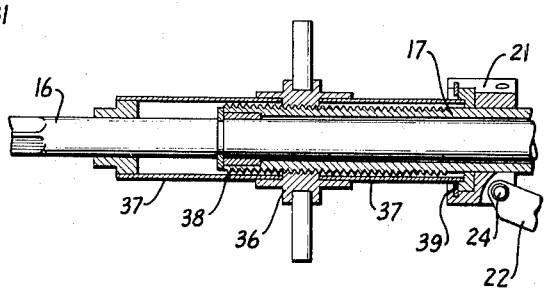
Figure 6:
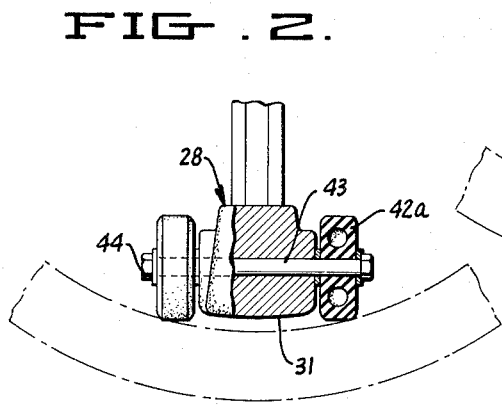
Figure 7:
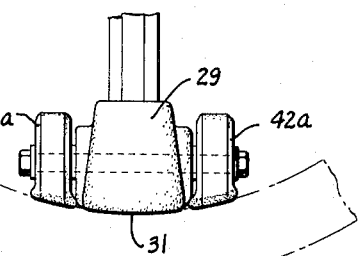
Figure 4:
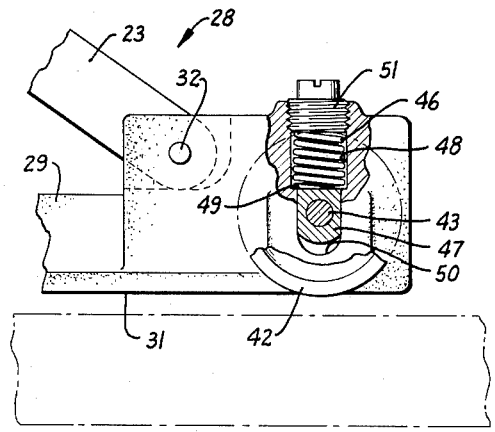
Figure 5:
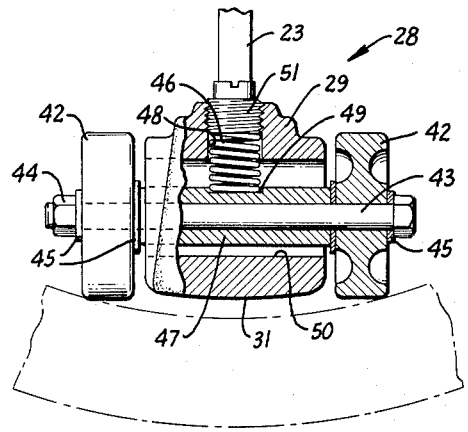
Figure 8:
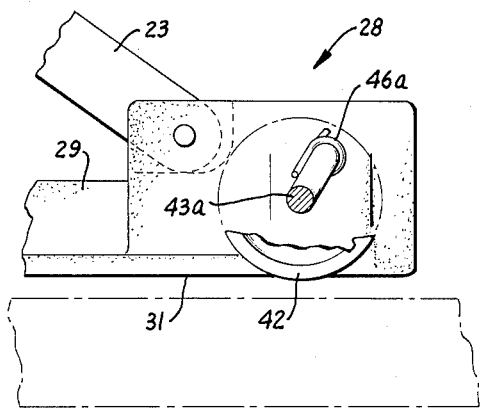
Figure 9:
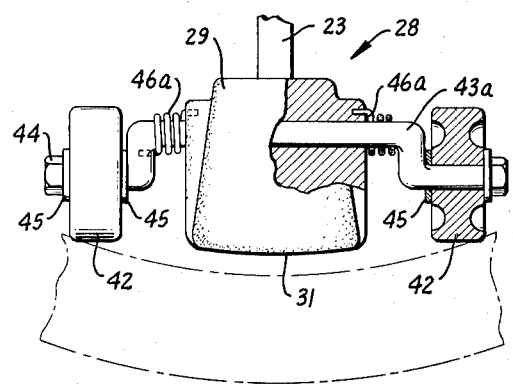
Figure 10:
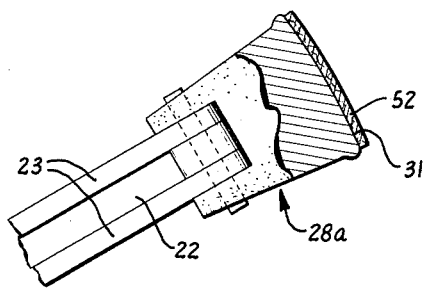

The preferred forms of the invention are illustrated in the accompanying drawings, forming a part of this description, in which:

FIGURE 1 is a side view showing an internal pipe cutting tool containing an improved arbor construction embodying the present invention shown as applied to the pipe with the pipe being shown in section;

FIGURE 2, a cross sectional view illustrating the arbor of the invention as shown in FIGURE 1 taken substantially in the plane of line 2—2 thereof;

FIGURE 3, a cross sectional view taken substantially at the plane of line 3—3 of FIGURE 2;

FIGURE 4, an enlarged fragmentary view of a portion of FIGURE 1, with certain parts broken away, illustrating a preferred method of mounting the improvement of the present invention;

FIGURE 5, a fragmentary end view of the structure shown in FIGURE 4, with parts broken away to illustrate internal structure thereof;

FIGURE 6, a view similar to that shown in FIGURE 5, but illustrating an alternate form of the invention;

FIGURE 7, the view shown in FIGURE 6 as it appears after the arbor shaft has been positioned in central alignment;

FIGURE 8, a fragmentary elevational view similar to that shown in FIGURE 4 but illustrating still another embodiment of the invention;

FIGURE 9, an end view of the structure shown in FIGURE 8 with certain parts broken away to illustrate the internal structure thereof; and FIGURE 10, a fragmentary view illustrating an alternate form of the tool shown in FIGURES 1 through 5 in which means are included for improving the grip of the arbor on the internal surface of the pipe.

While I have shown only the preferred forms of my invention, it should be understood that various changes or modifications may be made within the scope of the claims attached hereto without departing from the spirit of the invention.

Referring more particularly to the drawings, there is shown in FIGURES 1 through 5 an internal pipe cutter 11 mounted for rotational motion on an improved arbor 12 constructed according to the invention. The pipe cutter 11 contains a cutting head 13 carrying a cutter blade 14 and obtains its rotary motion from shaft 16 which is journaled through the arbor 12. The pipe cutter 11 is carried on the far end of shaft 16 and is driven from suitable drive means such as a motor (not shown) and operates according to the description given in my co-pending application cited above entitled Internal Pipe Cutter. The operation and description of this cutter head and the drive mechanism therefor will not be repeated herein, but certain common portions of the arbor necessary to explain the function and operation of this invention will be explained again for the sake of illustration.

Thus, as shown at FIGURE 1, the pipe tool holding mechanism or arbor 12 is mounted on the tubular sleeve 17 which is constructed to allow shaft 16 to be journaled therein and provide rotation to the cutter head. The tubular sleeve 17 thus serves as a hub for the shaft and is held in position by anchoring means 18 which holds the unit in place inside of the pipe.

Although an internal pipe cutter is used for the sake of illustration because this tool is particularly adapted for use with the arbor of the present invention, it will be appreciated that the invention is not to be limited by any particular type of rotative tool that can be mounted on the shaft, nor that the arbor be limitetd to a tubular sleeve in the event that such construction is not necessary to hold the tool. In other words, powered versions of the machines shown in the Montgomery patent or of my Adjustable Pipe Machining Tool cited above may also be used with the improved arbor construction shown herein.

Referring again to FIGURE 1, it is seen that the anchoring means 18 comprises a stationary bearing 19 and a movable bearing 21 mounted on the sleeve 17, and that these bearings have fingers 22 and 23 pivoted thereto at 24 and 26 and to each other intermediate their length at 27. In the preferred form, there are preferably three sets or groups of fingers symmetrically spaced 120° apart, and each group contains a pair of fingers serving as one unit and the single finger carried therebetween for a symmetric and strong construction.

Each group of fingers has an elongated pipe engaging member 28 attached to the finger units thereof at the outer extremities. As shown in FIGURE 1, the pipe engaging member 28 has an elongated body 29 with a curved pipe engaging surface 31 at the outer extremity thereof. The pipe engaging member contains U-shaped recesses on the inner sides for receiving the units of fingers in pivotal attachment. Thus the fingers 22 are attached on pin 32, and fingers 23 are attached by pin 33 which is slidable in slot 34.

The fingers are expanded radially to force the pipe engaging members 28 against the inner surface of the pipe and provide a strong grip therein while at the same time centering the shaft 16 by moving the bearing 21 toward bearing 19. This movement is accomplished by squeezing the bearings together through rotation of nut 36 which provides advancement of the sleeve 37 in which the nut is mounted as the nut 36 rotates with respect to the threaded end 38 of tubular sleeve 17, see FIGURE 3. This axial movement is then transmitted between sleeve 37 and bearing 21 through a thrust collar 39 which is constructed so that the bearing 21 may also be retracted by reverse movement. A further description of the construction and operation of this form will be found in my co-pending application entitled Internal Pipe Cutter cited above.

So far, the description relates to the elements utilized in my prior applications, but it is important to understand these structures because the improvement described in the present invention is preferably constructed in such a way that none of the advantages obtained in my prior applications are abrogated. Thus, in my improved form, a wheel supporting structure 41 is mounted on at least one of the pipe engaging members 28 and means are associated therewith for retracting the periphery of the wheel supporting structure toward the central axis of the arbor with respect to the pipe engaging members 28 as the anchoring means is expanded into place.

In general, the wheel supporting structure can be retracted by any suitable retracting means. The design of the retracting means will depend somewhat on the size of the tool and other factors. However, it is generally preferred to utilize means which automatically retract as the expanding members are moved outward toward the pipe wall where they make their total and complete contact. Briefly speaking, this is accomplished by utilizing resilient means for urging the contacting surfaces or peripheries of the wheels radially outward from the member on which the contacting surfaces of the wheels are supported with a force sufficient to support the weight of the tool, yet with sufficient resiliency that the expansion action obtained when tightening the tool in place is sufficient to overcome the resilient force and urge the member on which they are mounted against the pipe surface. Once the member is urged tightly against the pipe wall the wheel supporting structure is no longer of any influence in regard to the centering of the arbor shaft. However, the wheel supporting structure still provides some resistance to the torque forces that tend to rotate the tool with respect to the pipe when the machine is in operation.

In most cases it is sufficient to provide the wheel supporting structure on only one unit of the anchoring means 18 and in the units containing pipe engaging members 28 the wheel supporting structure is mounted on these pipe engaging members. Although it is only necessary to provide the wheel structure on one unit to achieve the mobility mentioned above, it is sometimes desirable to provide wheel supporting structures on all three members in order to protect the internal surface of the pipe where such surfaces are sensitive to shock. For example, epoxy lined asbestos-cement is easily chipped or broken when struck by hammer like blows of a hard metallic surface.

In such a situation it is considered desirable to provide wheels on all three units. In this case, the anchoring means can be expanded until all three sets of wheels contact the inner surface of the pipe, and then the machine is rolled into the pipe without danger of damaging the delicate lining in any way. Static pressure of the pipe engaging members against epoxy will cause no damage and the greater danger of scratching or abrading the epoxy as the machine is inserted or withdrawn is avoided.

As indicated above, the preferred means for retracting the wheel supporting structure toward the central axis of the arbor is automatic in operation and contemplates a resilient means. This resilient means may consist of a spring or a compressed air cushion which tends to provide a substantially constant force and is completely reliable in lifting the machine from the pipe surface after the anchoring means are retracted. Although such automatic means are generally preferred, it is believed that if extremely large pipes are to be operated upon, it may be desirable to utilize powered means for operating the wheel supporting structure from a wheel position to a retracted position. In such a case, pneumatic or hydraulic cylinders are suitable as the retracting means and the operation thereof is controlled by air pressure or liquid pressure regulated from the outside. Accordingly, in its broad aspects the invention also contemplates such power means for retracting the wheel supporting structure.

As best seen in FIGURES 1 and 2, the wheel structures preferably comprises four wheels 42 mounted on two axles 43 and disposed at each end of the pipe engaging member 28. The pipe engaging member 28 which carries the wheels may be larger than the other pipe engaging members as shown, if desired, in order to provide a better mount for the axles.

As here shown, the wheels 42 are constructed of hard rubber. Alternatively, the wheels can be constructed of metal with hard rubber tires or a fibre molded product. The wheels are mounted to extend a slight distatnce beyond or below the horizontal alignment of the bottom surface 31 of pipe engaging member 28 or slightly above the surface as is desirable. As long as these wheels are about even or beyond the surface 31 of the pipe engaging members 28 they will always touch the wall of the pipe and prevent the pipe engaging members from doing so when the expanding members are not opened to the full diameter of the pipe. It will be appreciated that this position is that which is obtained when the wheels are supporting the weight of the pipe unit as they do when the unit is inserted into and retracted from the pipe. More or less force on the spring means will, of course, vary the position of the wheels with respect to the pipe engaging members.

As best seen in FIGURES 4 and 5, the wheels 42 are secured on axles 43 by means of nut 44 suitably screwed to the threaded ends of the axles. The wheels carry suitable washers 45 providing bearing surfaces so that the wheels may move with respect to the pipe engaging members 28.

In order to render the wheels retractable, the axles are supported by springs 46 which provide sufficient force when compressed in the position shown in FIGURE 5 to hold the pipe engaging members away from the internal surface of the pipe as shown, yet which may be compressed further as the anchoring means 18 are expanded into place so that the pipe engaging member 28 makes proper contact with the inner surface of the pipe.

In the preferred form, the axles 43 are journaled through a special manganese bronze bushing 47 which is mounted for axial movement in slot 50 at either side of the pipe engaging member 28. The slots are accurately machined to act as a guide for keeping the axles in alignment at all times. As best seen in FIGURES 4 and 5, the compression springs 46 are held in a cavity 48 which is accurately reamed so as to closely confine the spring while allowing it to move freely upward and downward without friction againt the cavity wall. The spring bears against the bronze bushing at a cross milled flat surface 49 and this also acts as a centering device and holds the lower end of the spring. The upper end of the spring is held onto an adjustable retainer 51 which is threaded into the upper end of the cavity 48 and serves to retain the spring. This retainer also allows for adjusting the compression on the springs and thereby the height of the wheel and axle assembly. Preferably, the bushings extend beyond the width of the cast pipe engaging members 28 so as to bear against the internal washers 45 and serve as a bearing surface therefor.

Although only one spring 46 is shown for each axle, it is, of course, possible to provide two springs if desired. Other modifications will be apparent from the description given above. The description serves to illustrate a practical design, the assembly there being obvious from the structure shown. With these springs properly adjusted, it is also seen that the wheeled supporting structure will hold the anchoring means free of the pipe when it is inserted and yet allow the anchoring means to assume its normal position when expanded into the pipe, and then automatically lift the anchoring unit out of contact with the pipe surface when the anchoring means is retracted from gripping position so as to allow the unit to be withdrawn from the pipe by wheeling it therefrom.

Another method of utilizing spring means is the automatic retracting means for the wheels as shown in FIGURES 8 and 9. As there shown, the axle is constructed to have a central U shape or eccentric as shown by axle 43a, and is journaled through the elongated pipe engaging members 28 so that it rotates therein. The position of the outer extremities of the axle 43a which carry wheels 42 is moved axially toward and away from the central portion of the unit. Wheels 42 are bolted onto the axle with nuts 44 and washers 45 as in the embodiment of FIGURES 1 through 5. However, springs 46a are provided on each side of the axle and have ends gripping the U shaped body portion of the axle and the channel members so as to force the wheels downward. Yet the springs are yieldable when the pressure from the anchoring means is applied so as to allow the wheels to retract out of position and the pipe engaging member 28 to contact the surface of the pipe. Accordingly, it will be appreciated that there are numbers of spring units and various methods of mounting the same may be provided in order to utilize springs of the automatic retracting means for retracting the pipe engagement members 28 from the walls of the pipe as the anchoring unit is extracted.

It is also contemplated that pneumatic pressure may be used for the yieldable retracting means and FIGURES 6 and 7 illustrate a typical embodiment utilizing such means. As there shown, axle 43 is journaled straight through the pipe engaging members 28 and held in position by nuts 44 and washers 45 as in the other forms. However, wheels 42a are provided with inflatable tires which normally hold a pipe engaging member away from the surface of the pipe as illustrated in FIGURE 6. However, when the anchoring means are expanded, the tires 42a are forced to flatten out as shown in FIGURE 7 and the pipe engaging members 28 assume their contacting positions with the pipe surface as shown. Pneumatic pressure in the tire 42a then serves to return the unit to the position shown in FIGURE 6 when the anchoring means are contracted. In this way, an automatic retractiing mechanism is provided which operates by air pressure.

It will be appreciated that other air pressure forms can be used such as utilizing air cylinders in place of the springs in the cavities 48 of the embodiments illustrated in FIGURES 4 and 5. In addition, it will be appreciated that where especially heavy tools are being utilized and automatic retracting means are not desired, that external fluid pressure may be applied by utilizing cylinders or like structures as in conventional hydraulic or air brakes. However, for the sake of simplicity and absolutely reliable operation, the automatic retracting means herein shown are preferred.

In FIGURE 10 there is shown a modified form of pipe engaging member 28a which contains a special coating 52 on the pipe engaging surface 31 thereof. This coating 52 is constructed of a high friction material which provides a better grip on the internal surface of the pipe and provides a more reliable resistance against torque forces when the tool is power operated as indicated above. In the prior structure utilizing pipe engaging members, it was necessary that at least one pipe engaging member contained a smooth surface so that the unit could be slid axially through the pipe. However, in the present embodiment, it is possible to utilize a coating 52 on all of the pipe engaging members 28 because the wheel structure provides easy movement into and away from an operative position within the pipe. By thus providing a coating 52 on all three pipe engaging members 28a, a symmetrical structure is maintained which positively centers the shaft and provides the desired operating performance for the particular tool being held on the arbor of this invention.

For all of the foregoing reasons, it is seen that I have provided an improved arbor construction for mounting an internally centered arbor shaft whereby a tool may be rotated around the central axis of the pipe for cutting and machining operations thereof. It is also seen that I have provided an improved arbor construction of the character described which is particularly suitable for use on extra large pipe to provide for easy handling of heavy machines and render such machines operable under field conditions and also capable of use in pipes having fragile lining without danger thereto. It is also seen that my improved structure provides the advantages of prior known internal arbor structures and is capable of absolutely reliable operation.

I claim:

1. In an arbor construction for providing a shaft in central alignment within a pipe suitable for mounting a rotatable tool thereon containing a plurality of radially expandable units having gripping surfaces adapted to grip the inner surface of a pipe, in combination, a wheeled supporting structure on one of said expandable units for movement of said arbor construction axially in the pipe, and means for displacing the periphery of the wheeled supporting structure toward the central axis of the arbor with respect to the gripping surface of the unit as the expandable units are expanded to allow the radially expandable units to grip the pipe.

2. In an arbor construction for providing a shaft in central alignment within a pipe suitable for mounting a rotatable tool thereon containing a plurality of radially expandable units having gripping surfaces adapted to grip the inner surface of a pipe, in combination, a wheeled supporting structure on one of said expandable units comprising an axle wheel means on said axle, and means for displacing the axle with respect to said one of said expandable units toward the central axis of the arbor as the expandable units are expanded.

3. In an arbor construction for providing a shaft in central alignment within a pipe suitable for mounting a rotatable tool thereon containing a plurality of radially expandable units having gripping surfaces adapted to grip the inner surface of a pipe, in combination, a wheeled supporting structure on one of said expandable units comprising a pair of axles mounted on one of said expandable units, a pair of wheels on each of said axles, said wheels being symmetrically located on each side of the expandable unit on which the axles are mounted, and means for displacing the axles with respect to said one of said expandable units toward the central axis of the arbor as the expandable units are expanded.

4. In an arbor construction for providing a shaft in central alignment within a pipe suitable for mounting a rotatable tool thereon containing a plurality of radially expandable units having gripping surfaces adapted to grip the inner surface of a pipe, in combination, a pair of axles mounted on one of said expandable units, a pair of wheels on each said axles, said wheels being symmetrically located on each side of the expandable unit on which the axles are mounted and resilient means for urging the periphery of the wheels away from the central axis of the arbor an amount sufficient to support the weight of the arbor and associated tools while allowing complete displacement of the periphery of the wheels with respect to the gripping surface of the expandable unit whereby the expandable unit can contact the pipe wall.

5. The arbor construction defined in claim 4, in which the resilient means are spring means.

6. The arbor construction defined in claim 4, in which the resilient means are air cushion means.

7. A pipe tool mounting mechanism comprising a shaft for carrying a pipe tool rotatably around the central axis of the pipe, a pair of bearing members on said shaft mounted for relative axial movement, a plurality of groups of expandable fingers carried on said bearings and expandable on axial movement of the bearings toward one another, said expandable fingers having external surfaces adapted to grip the inner surface of the pipe, a wheeled supporting structure on one said expandable units, and means for displacing the periphery of the wheeled supporting structure with respect to the gripping surfaces of the expandable fingers.

8. A pipe tool mounting mechanism comprising a shaft for carrying a pipe tool rotatably around the central axis of the pipe, a pair of bearing members on said shaft mounted for relative axial movement, a plurality of groups of expandable fingers carried on said bearings and expandable on axial movement of the bearings toward one another, an elongated pipe engaging member carried on each group of expandable fingers, a wheeled supporting structure on one of said pipe engaging members, and means for displacing the periphery of the wheeled supporting structure with respect to the pipe engaging member.

9. A pipe tool mounting mechanism comprising a shaft for carrying a pipe tool rotatably around the central axis of the pipe, a pair of bearing members on said shaft mounted for relative axial movement, a plurality of groups of expandable fingers carried on said bearings and expandable on axial movement of the bearings toward one another, an elongated pipe engaging member carried on each group of expandable fingers, a pair of axles mounted on the pipe engaging member of one of said groups of expandable fingers, a pair of wheels on each of said axles, said wheels being symmetrically located on each side of the pipe engaging member on which the axles are mounted, and resilient means for urging the periphery of the wheels away from the central axis of the shaft an amount sufficient to support the weight of the mechanism and associated tools while allowing complete displacement of the periphery of the wheels with respect to the pipe engaging member whereby the pipe engaging members can contact the pipe wall.

10. The pipe tool mounting mechanism defined in claim 9, in which the resilient means are spring means.

11. The pipe tool mounting mechanism defined in claim 9, in which the resilient means are air cushion means.

12. The pipe tool mounting mechanism defined in claim 9, in which the pipe engaging members are coated with a high friction material.

No references cited.

WILLIAM W. DYER, Jr., *Primary Examiner.*